(12) United States Patent
Rowlette et al.

(10) Patent No.: US 6,244,515 B1
(45) Date of Patent: Jun. 12, 2001

(54) UNIVERSAL TWO STAGE GAS FURNACE IGNITION CONTROL APPARATUS AND METHOD

(75) Inventors: Mitchell R. Rowlette, Berea; Mark A. Eifler, Frankfort, both of KY (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/436,126

(22) Filed: Nov. 8, 1999

(51) Int. Cl.$^7$ ............................ G05D 23/00; F25B 29/00
(52) U.S. Cl. ............................ 236/1 E; 236/11; 165/256
(58) Field of Search .................... 236/11, 1 E, 1 EA, 236/1 EB; 62/175; 165/256, 261; 431/60

(56) References Cited

U.S. PATENT DOCUMENTS

| | | | |
|---|---|---|---|
| 4,638,942 | * 1/1987 | Ballard et al. | 236/10 |
| 5,271,556 | 12/1993 | Helt et al. | 236/11 |
| 5,806,760 | * 9/1998 | Maiello | 236/11 |
| 5,902,099 | 5/1999 | Rowlette et al. | 431/22 |

* cited by examiner

Primary Examiner—William Wayner
(74) Attorney, Agent, or Firm—Russell E. Baumann; Frederick J. Telecky, Jr.

(57) ABSTRACT

A gas furnace control for two stage gas furnaces which can be used with either a single stage or a two stage room thermostat monitors the length of time the first, low combustion, stage is energized and upon exceeding a selected period of time, e.g., 10 minutes, energizes the second, high combustion stage. Energization of the second stage signal (W2) also energizes the second stage without regard to timing of the first stage.

9 Claims, 15 Drawing Sheets

UNIVERSAL TWO STAGE GAS FURNACE IGNITION CONTROL APPARATUS AND METHOD

FIELD OF THE INVENTION

This invention relates generally to gas furnace controls and more specifically to controls for furnaces having two different gas burning rates, or stages.

BACKGROUND OF THE INVENTION

The use of two stage gas furnaces has become quite pervasive recently. Two stage gas furnaces essentially burn gas at two rates, one low and the other is high. In most situations, the low combustion rate is sufficient to satisfy the heat loss from a conditioned environment (e.g., a home). However, when the outdoor environment becomes quite cold the second high combustion rate is used to satisfy the increased demand. The greatest advantage to the two stage furnace is that it allows the furnace to maintain the conditioned environment in a more stable manner. For example, a single stage heating system for a home may be designed to maintain the indoor temperature at 70° F. while the outdoor temperature is 0° F. Depending on the insulation factors and the size of the relevant building, this could require a 100,000 BTU/Hr combustion rate on the furnace. However, if the outdoor temperature is 45° F., the capacity (above the actual need) of this furnace will cause the temperature to exceed a selected desired setting, such as 70° F., in the home (actually caused by the latent heat stored in the heat exchanger of the furnace). The two stage furnace corrects this over-temperature problem by operating at a low fire condition (approximately 50,000 BTU/hr for a 100,000 BTU/hr furnace). This improves the efficiency and comfort level in the home.

In the prior art, two stage gas furnaces required the use of a two stage room thermostat in which the second stage of the furnace is engaged when the second stage of the room thermostat is energized (a separate set of contacts set to close 2° F. below the first stage setting). Another approach is disclosed in U.S. Pat. No. 5,271,556. In this patent, a jumper is placed between the first stage signal (W1) and the second stage signal (W2) to the furnace. The control within the furnace then detects the simultaneity of the two signals when a single stage thermostat is used. The furnace then delays the operation of the second stage of combustion for 5 minutes. This allows the home owner to use a single stage room thermostat with a two stage gas furnace.

The former approach requires a special thermostat while the latter approach complicates wiring and increases the possibility of mistakes being made when the system installer is adding or replacing the jumper.

SUMMARY OF THE INVENTION

An object of the invention is to overcome the prior art limitations noted above. Another object of the invention is to provide a two stage gas furnace ignition control which can be used with either a two stage or a single stage room thermostat. Yet another object is the provision of a two stage gas furnace ignition control which is less subject to installation mistakes than prior art two stage controls.

Briefly, in accordance with the invention, since the second (higher) stage combustion is only required due to low outdoor ambient temperature or by changing the thermostat setting a certain amount higher, e.g., 10° F., the improved control monitors the length of time the first, low combustion, stage is energized. If this time exceeds a selected period, e.g., 10 minutes, the second, high combustion, stage is energized, independently of the type of room thermostat used (single or two stage) and with no jumper required between the two stage signals (W1 and W2) to energize the second stage ignition with a single stage thermostat. According to a feature of the invention, if the second stage signal (W2) is energized, the measurement of the time that the first stage is on is circumvented and the second stage ignition is immediately begun. This allows the features associated with a two stage room thermostat to be utilized as well by the control/furnace combination (for example, if the two stage room thermostat is moved to a selected delta degrees, such as 10° higher setting, both stages will be energized as soon as possible).

As an added benefit, fault tolerance is added to the system. If the wire to the second stage (W2) is broken or becomes loose the furnace/control will still function as a two stage gas combustion system as described above. It also removes the possibility of mistakes which could occur when the system installer is adding or replacing the prior art jumper mentioned above.

Additional objects and advantageous of the invention will be set forth in part in the description which follows and in part will be obvious from the description. The objects and advantages of the invention may be realized and attained by means of the instrumentalities, combinations and methods particularly pointed out in the appended claims.

BRIEF DESCRIPTION OF THE DRAWINGS

The accompany drawings, which are incorporated in and constitute a part of the specification, illustrate preferred embodiments of the invention and, together with the description, serve to explain the objects, advantages and principles of the invention. In the drawings.

DETAILED DESCRIPTION OF THE PREFERRED EMBODIMENTS

Figure 1A:
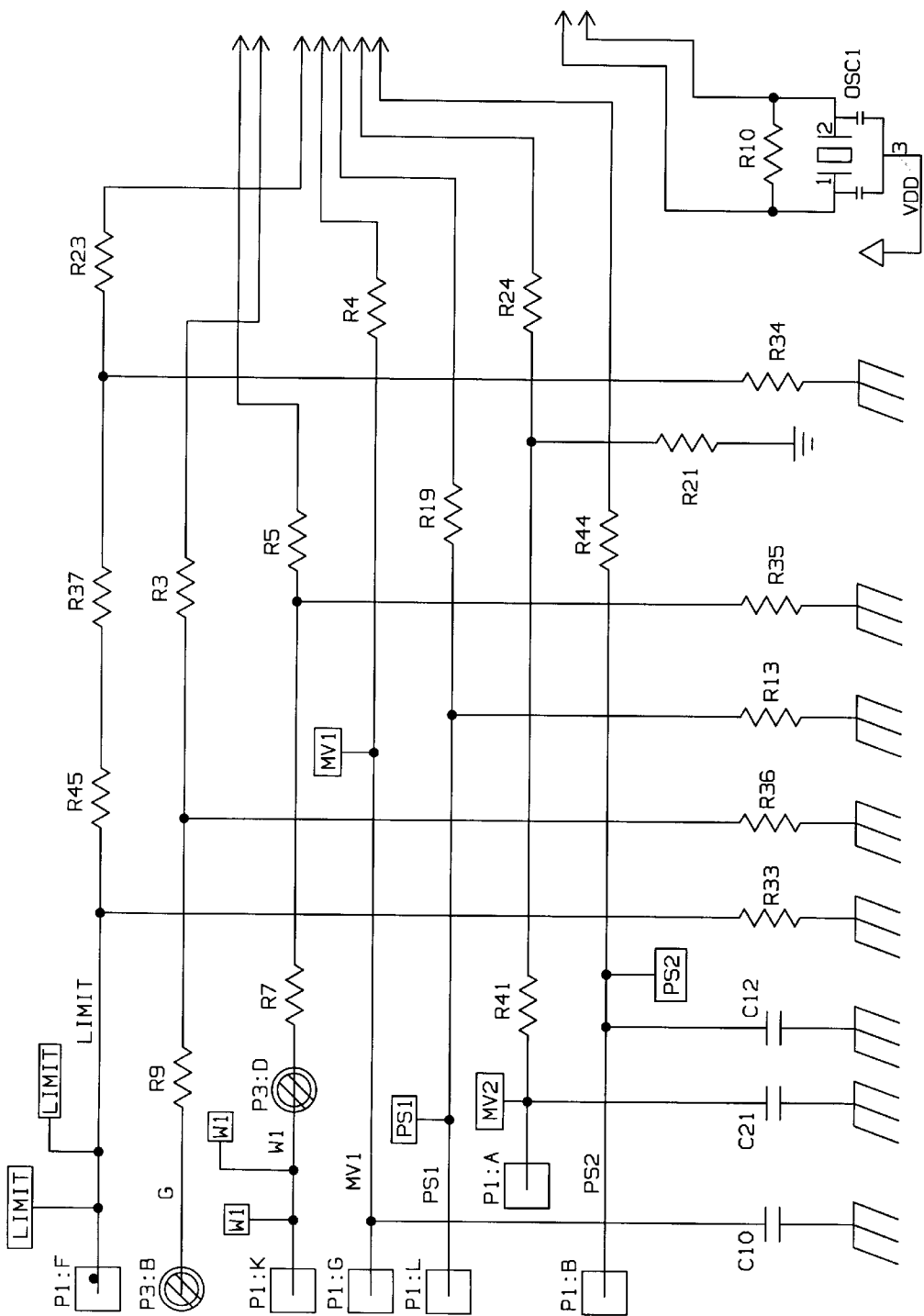
FIGS. 1a–1f together comprise a schematic diagram of a control made in accordance with the invention.
Figure 1B:
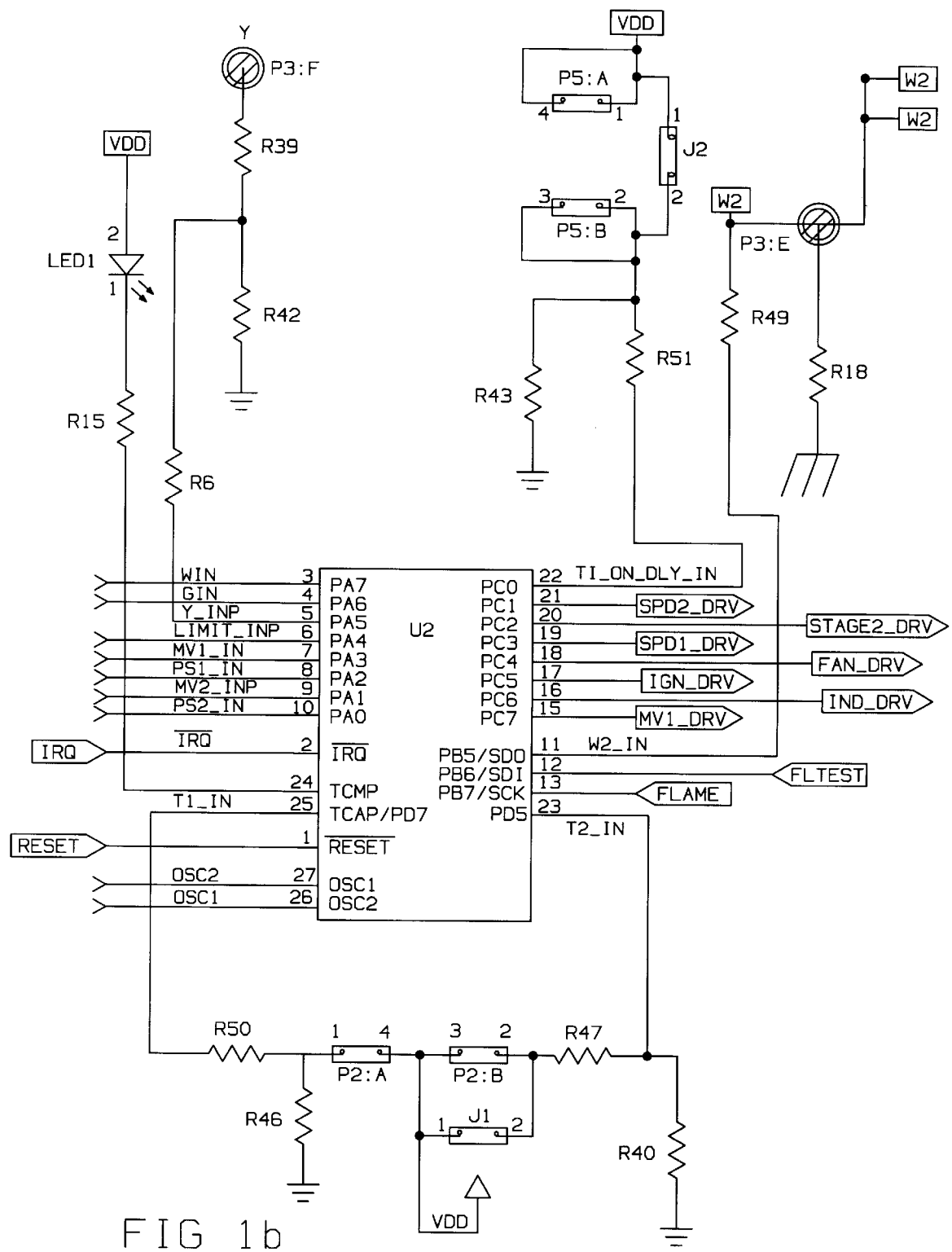
Figure 1C:
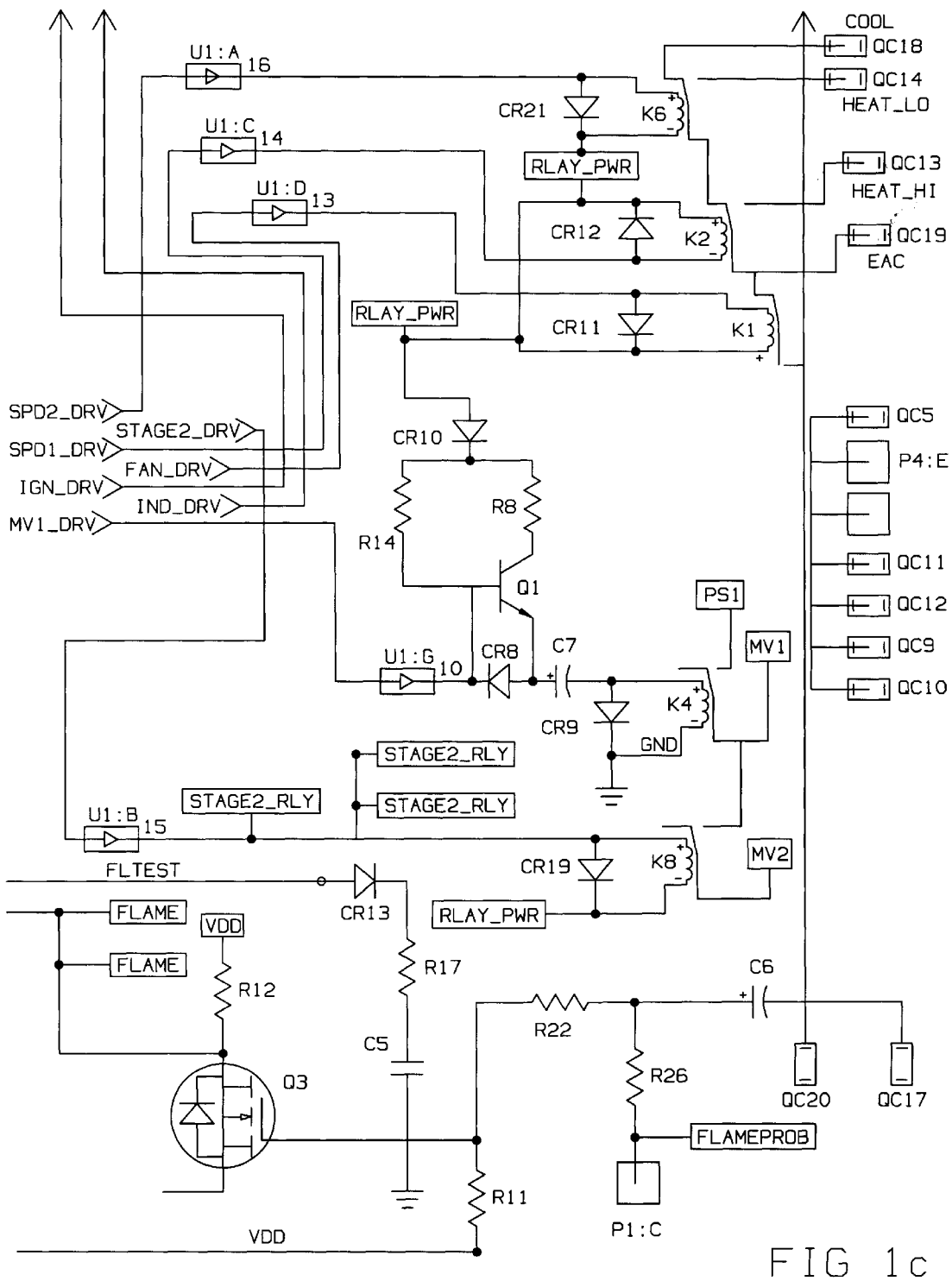
Figure 1D:
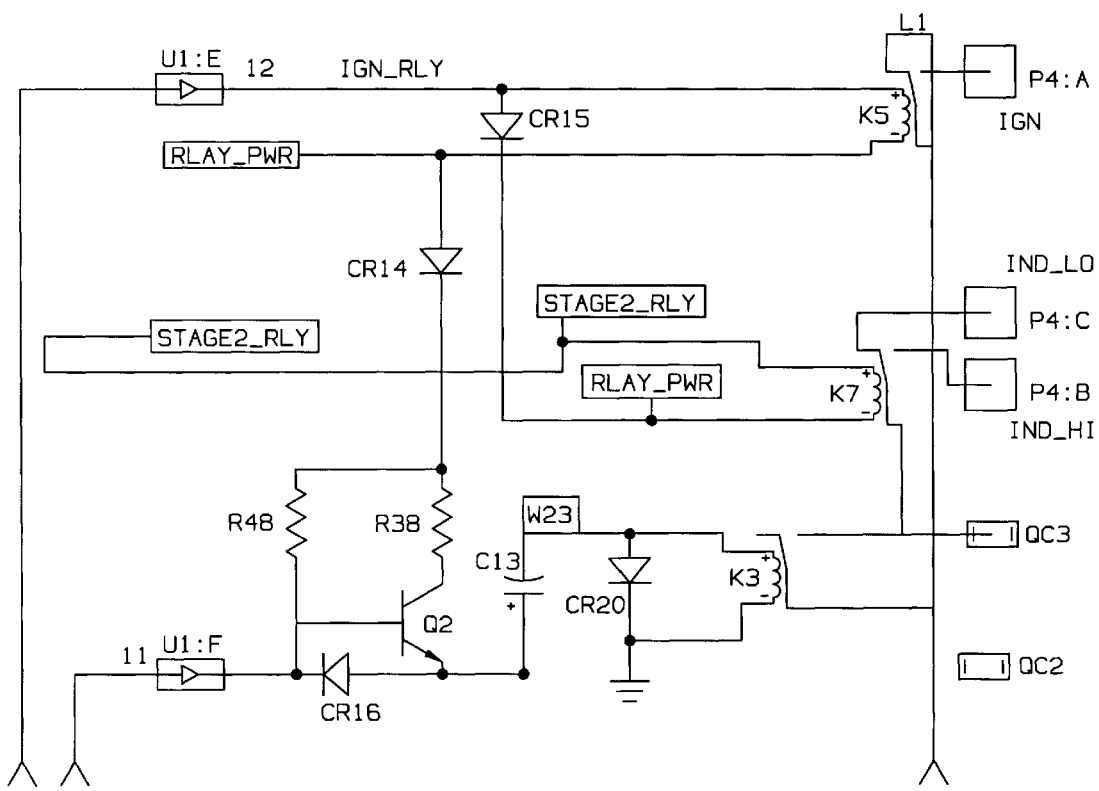
Figure 1E:
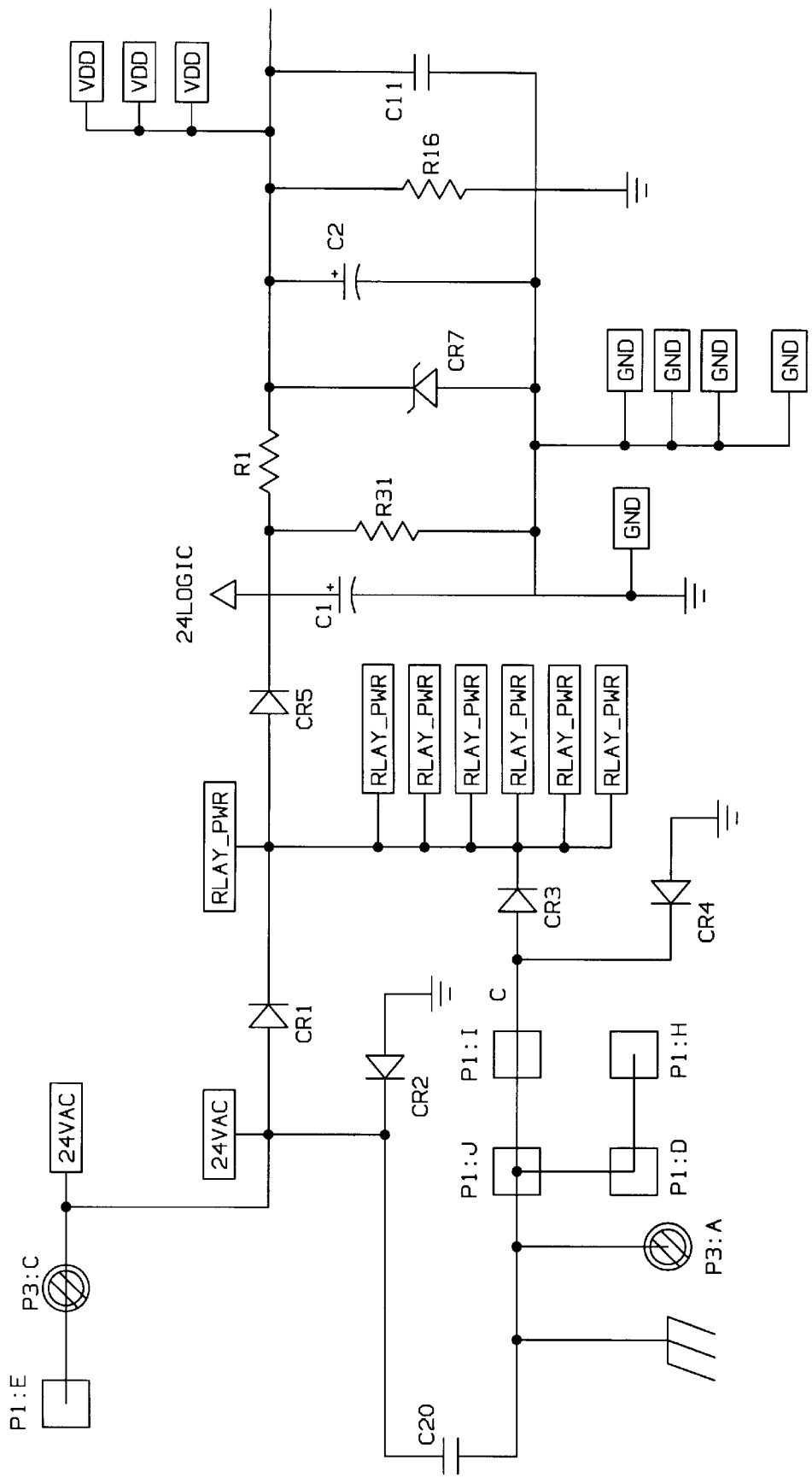

Referring to FIGS. 1a–1f, operation of the preferred embodiment of the invention will be described. As shown in FIG. 1e, power (24 VAC) is applied to the logic circuitry through connector P1 pin E (24 VAC) and connector P1 pins D, H, I, J (signal C). Screw terminal P3 pin C acts as an additional field connection point for the common signal of the 24 VAC power. Capacitor C20 acts as a noise filter for the 24 VAC power. The signal 24 VAC is connected to the anode of CR1 and the cathode of CR2. The anode of CR3 and the cathode of CR4 are connected to the C signal. These four diodes rectify the 24 VAC power to a DC power source RLAY_PWR (Cathode of CR1 and CR3) and GND (anode of CR4 and CR2). This is the power source for all relays on the assembly (K1–K8). The anode of diode CR5 is connected to RLAY_PWR and the cathode is connected to 24LOGIC. Diode CR5 acts to isolate the filter capacitor C1 (attached to 24LOGIC and GND) from RLAY_PWR. Capacitor C1 filters the rectified DC power. Resistor R31 is connected across capacitor C1 to discharge the capacitor during power interruption. One side of resistor R1 is attached to 24LOGIC while the other side of the resistor is connected to cathode of zener diode CR7. The anode of CR7 is connected to GND. Resistor R1 limits current flow to the zener diode while the zener regulates 24LOGIC to five volts DC (VDD). Capacitors C11 and C2 act to filter the five volt DC power. Resistor R16 is placed across the zener diode to discharge capacitors C11 and C22 during power interruption. The signal VDD supplies power to all the logic circuitry.

With reference to FIG. 1b, the oscillator for the microcontroller (U2) comprises OSC1, a ceramic resonator, and resistor R10. Pin 1 of OSC1 is connected to pin 27 of U2 and one side of R10. Pin 2 of OSC1 is connected to pin 26 of U2 and the other side of R10. Pin 3 of OSC1 is connected to VDD. OSC1 is stimulated by the microcontroller and resonates at a high frequency (e.g., 2.00 MHz). This provides the high frequency clock for the operation of the microcontroller. Resistor R10 provides feedback across the resonator to assure stability.

Figure 1F:
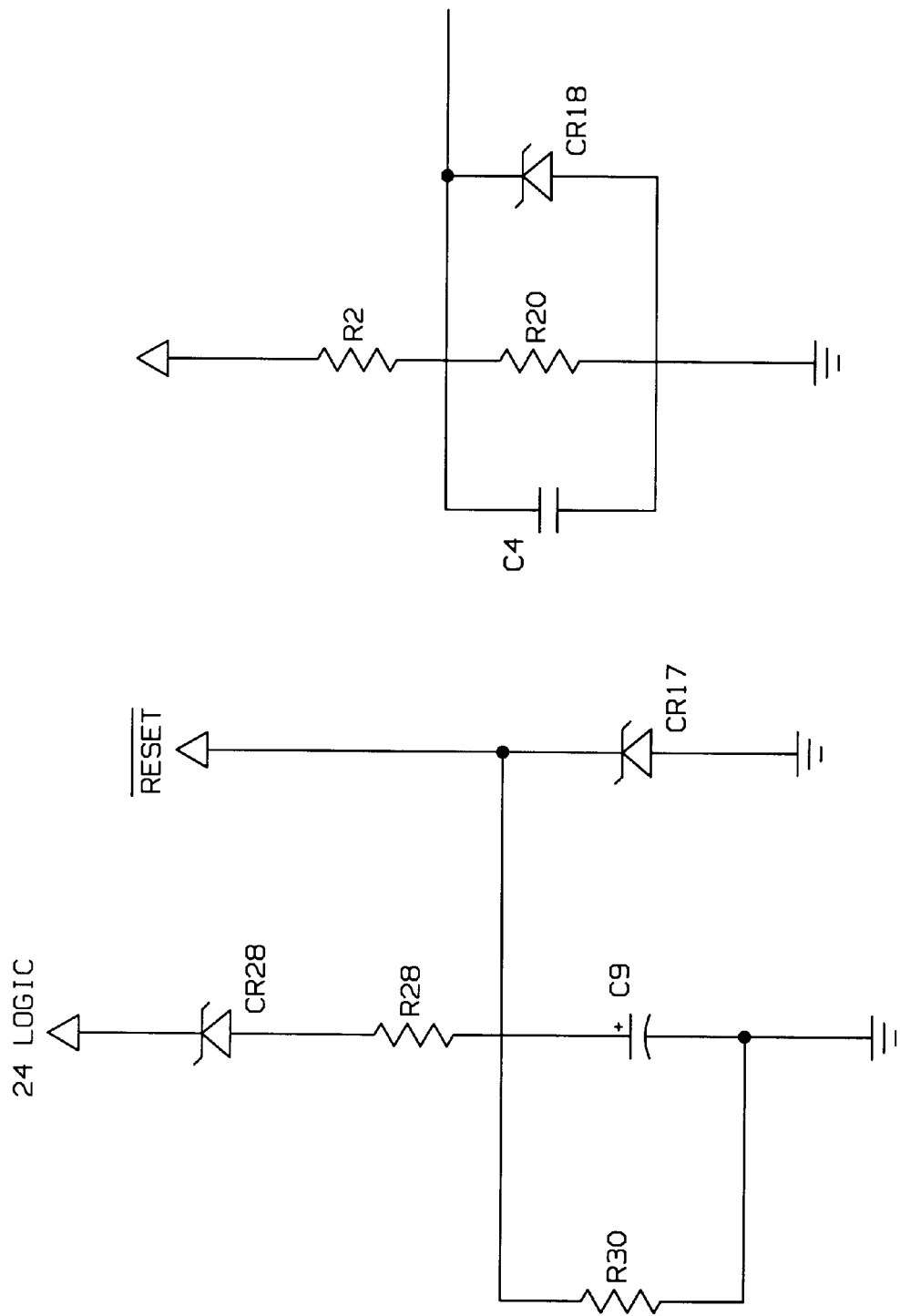

With reference to FIG. 1f, the signal 24LOGIC is also connected to the cathode of zener diode CR28. The anode of zener CR28 is connected to resistor R28. Zener CR28 acts as a voltage discriminator so that no current can flow through resistor R28 until the zener voltage is reached by the 24LOGIC signal. The other side of resistor R28 is connected to capacitor C9 (signal RESET') and reset pin reset pin 1 of the microcontroller U2. The other side of capacitor C9 is connected to GND. The serial connection of resistor R28 and capacitor C9 create a delay in the RESET' signal at power up of the control. Zener CR17 and resistor R30 are connected across capacitor C9. Zener CR17 acts as a voltage limit to protect the microcontroller. Resistor R30 discharges capacitor C9 during power interruption.

Again, referring to FIG. 1f, resistor R2 is connected to 24 VAC and interrupt pin 2 of the microcontroller U2 (signal IRQ'). Capacitor C4 is connected between IRQ' and GND and acts to filter the IRQ' signal. Zener diode CR18 is connected across capacitor C4 and protects the microcontroller from excessive voltage. Resistor R20 is also connected across capacitor C4 and acts to discharge capacitor C4 during power interruption. Signal IRQ' is a 5 volt DC, 60 Hz square wave (with 60 Hz, 24 VAC applied to control). This signal forms the time base for all operations of the microcontroller.

Signal W1 is generated by the room thermostat when the temperature falls 1° below the set point. W1 is input to the control via screw terminal P3 pin D. W1 is connected to resistor R7. The other side of resistor R7 is connected to resistor R35 while the other side of resistor R35 is connected to Common. This connection creates a voltage divider W_DIV. This divider acts to discriminate voltages below 11 VAC. Resistor R5 is connected between W_DIV and pin 3 of microcontroller U2 (signal WIN) and acts to limit current flow into the microcontroller.

Signal W2 is also generated by the room thermostat. If the conditioned room temperature falls 2° below the set point, W2 will become 24 VAC. W2 is input to the control via screw terminal P3 pin E. W2 is connected to resistor R18. The other side of R18 is connected to the common side of the 24 VAC power source. R18 acts as a pull-down on the signal W2. Resistor R49 is connected between W2 and pin 11 of microcontroller U2 (signal W2_IN) and serves to limit current flow into the microcontroller U2.

Signal W1 is output via pin K of connector P1 (FIG. 1e). This is connected to an external temperature limit (see switch 12, FIG. 2). The other side of the external limit is input to the control through pin F of P1 (signal LIMIT—FIG. 1a). The signal is pulled to Common through resistor R33 (when the limit switch is open, LIMIT is in phase with Common and when the limit switch is closed, LIMIT is in phase with 24 VAC). Resistors R45, R37 and R23 are serially connected between LIMIT and pin 6 of U2 and limits the current flow into the microcontroller (signal Limit—INP). The common connection between R23 and R37 is also connected to R34. The other side of R34 is attached to Common. This forms a voltage divider on the signal going into U2, to allow voltage discrimination on the input. The output of the external temperature limit switch (switch 12, FIG. 2) is serially connected to an external pressure switch (see switch 14, FIG. 2). The output of the external pressure switch is routed into the control at P1 pin L (signal PS1). This signal is pulled down by resistor R13 to Common such that if the pressure switch is open, PS1 will be in phase with Common. If the pressure switch is closed, PS1 will be in phase with W1. Resistor R19 is connected between PS1 and pin 8 of U2 (signal PS1_IN). Thus, the microcontroller is able to sense the condition of the pressure switch.

Signal G is generated by the room thermostat when the fan is to be turned on. Signal G is input to the control via screw terminal P3 pin B. Signal G is connected to resistor R9. The other side of resistor R9 is connected to resistor R36 while the other side of resistor R36 is connected to Common. This connection creates a voltage divider G_DIV. This divider acts to discriminate voltages below 11 VAC. Resistor R3 is connected between G_DIV and pin 4 of U2 (signal GIN) and acts to limit current flow into the microcontroller.

Figure 2:
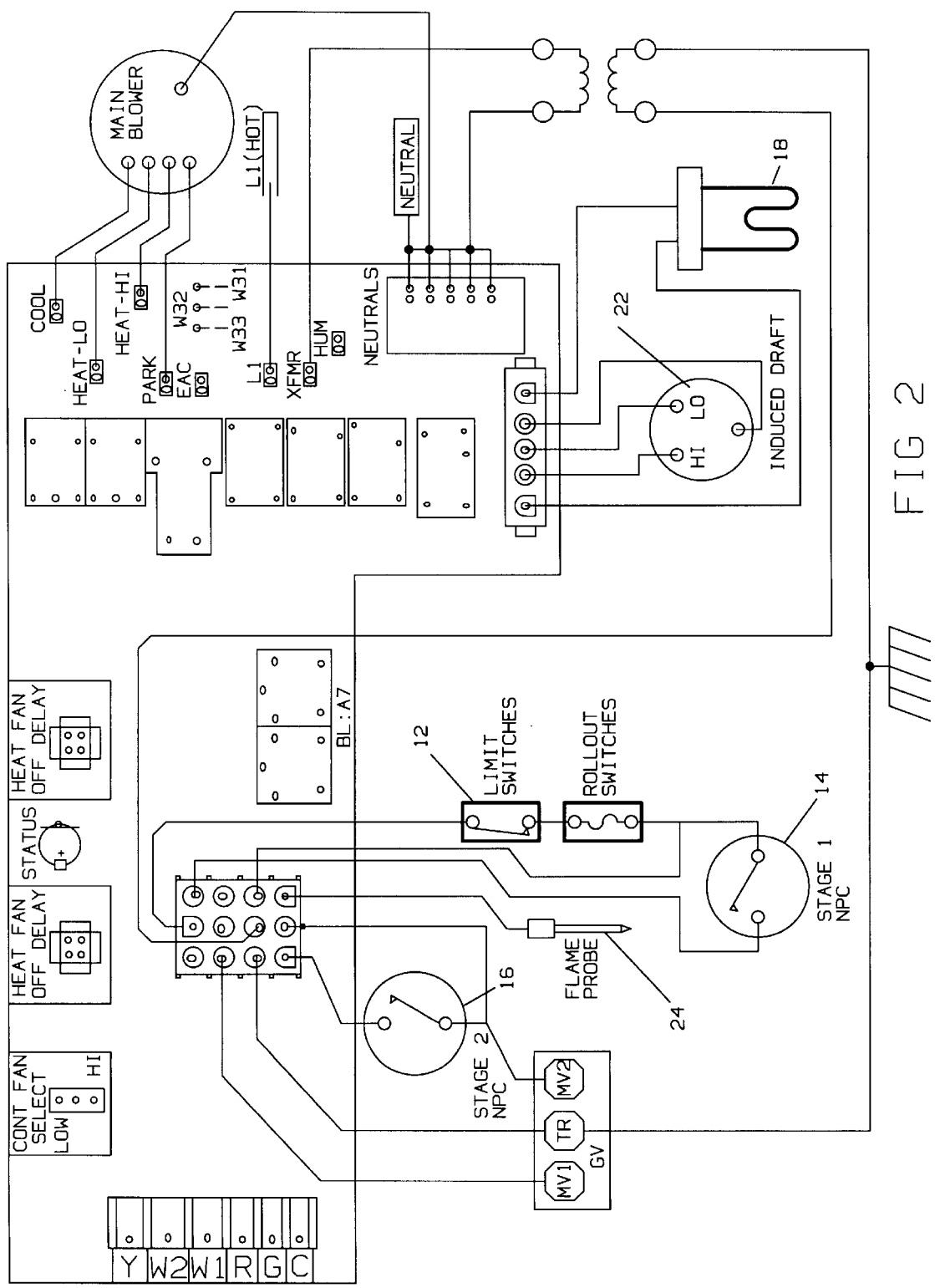
FIG. 2 is a schematic diagram showing system components and their connection to the control shown in FIGS. 1a–1f FIGS. 3a–3h are software flow charts used in conjunction with the control, including microcontroller U2, shown in FIGS. 1a–1f.

The signal PS2 is generated by the second stage pressure switch 16 (FIG. 2). The contacts of the second stage pressure switch close when the high speed tap of the induced draft motor is energized. Signal PS2 is input to the control via pin B of connector P1. Signal PS2 is filtered by capacitor C12 which is also connected to Common. Resistor R44 is connected between signal PS2 and pin 10 of microcontroller U2 (signal PS2_IN) and acts to limit current into the microcontroller U2.

The condition of the gas valve is input via pin G of connector P1 (signal MV1). Capacitor C10 is connected between MV1 and Common and acts to filter noise from the signal MV1. Resistor R4 is connected between MV and pin 7 of microcontroller U2 (signal MVI_IN) and acts to limit current flow into the microcontroller. This allows the microcontroller to sense if voltage is applied to the gas valve.

Signal MV2 is the feedback from the second stage (or high capacity) connection of the gas valve. Signal MV2 is input to the control via connector P1 pin A. Capacitor C21 is connected between signal MV2 and Common to filter unwanted high frequency noise from the signal. One side of resistor R41 is connected to signal MV2 while the other side is attached to resistor R21 which is a pull-down on the signal MV2 to Common. Resistors R41 and R21 are connected to form a voltage divider on the MV2 signal to act as a voltage discriminator for microcontroller U2. Resistor R24 is connected between the voltage divider of resistors R41/R21 and pin 9 of U2 (signal MV2_INP) and serves to limit current flow into U2.

Signal Y is generated by the room thermostat when the room temperature rises above the set point and the cooling unit is energized. Y is input to the control via screw terminal P3 pin F (FIG. 1b). Y is connected to resistor R39. The other side of resistor R39 is connected to resistor R42 while the other side of resistor R42 is connected to common. This connection creates a voltage divider whose junction is connected to resistor R6, the other side of which, Y_INP, is connected to pin 5 of the microcontroller. This divider acts to discriminate voltages below 18 VAC. Resistor R39 acts to limit current flow into the microcontroller. Resistor R6 acts as an additional isolation to limit current flow into the microcontroller. This connection to the microcontroller allows the microcontroller to sense the condition of the room thermostat signal Y.

Blower time delays (when the fan is being de-energized) in the heating mode may be selected by use of a two pin jumper J1 (FIG. 1b) and a four pin header connector P2. Pins 3 and 4 of connector P2 are connected to VDD. Pin 2 of connector P2 is connected to resistor R47 and pin 1 and connector P2 is connected to resistor R50. The other side of resistor R47 is connected to pin 23 of U2 (signal T2_IN).

Resistor R40 is connected between T2_IN and ground GND to act as a ground reference for the signal to the microcontroller. The other side of resistor R50 is connected to pin 25 of microcontroller U2 (signal T1_IN). Resistor R46 is connected between pin 1 of connector P2 and ground GND. This references the signal T1_IN to ground. The position of jumper J1 on the connector P2 may be detected by the microcontroller through the two signals T1_IN and T2_IN.

Pin 22 of microcontroller U2 is connected to resistor R51 (signal T1_ON_DLY_IN. The other side of R51 is connected to pin 2 and pin 3 of four pin header P5. The other two pins of P5 (pins 1, 4) are connected to VDD. Pins 2, 3 of P5 are also attached to resistor R43. The other side of R43 is connected to ground GND. Resistor R43 acts as a pull-down on signal T1_ON_DLY_IN. Jumper J2 is placed on header P5 to select the heat fan blower delay on time. Pin header P5 and resistors R51, R43 allow the microcontroller to determine the position of jumper J2 via the signal of pin 22 of U2.

With reference to FIG. 1b, pin 17 of U2 (signal IGN_DRV) is connected to pin E of U1. The output of U1 (pin 12) is connected to one side of the K5 relay coil. The other side of the K5 relay coil is connected to signal RLAY_PWR. Diode CR15 is connected across the coil and acts to suppress back inductive flyback energy when the relay is turned off. The common terminal K5 is connected to L1, the 120 VAC source (quick connects QC17 and QC20). The normally open terminal of K5 is connected to pin A of P4 (signal IGN). This is an output to an external silicon carbide igniter 18 (see FIG. 2) which is used to ignite the natural gas during a heating cycle of the gas furnace. Thus, the microcontroller (U2) is able to control the HIS (hot surface igniter) of the furnace.

Pin 18 of microcontroller U2 (signal FAN_DRV) is connected to pin D of U1. The output of U1 (pin 13) is connected to one side of the K1 relay coil. The other side of the K1 relay coil is connected to RLAY_PWR. Diode CR11 is connected across the coil to suppress back inductive flyback energy when the relay is turned off. The common terminal K1 is connected to QC19 (signal EAC). The normally open terminal K1 is connected to L1. QC19 is connected to an external electronic air cleaner such that whenever the relay K1 is energized the air cleaner will be energized also. The normally open terminal of K1 is also connected to the common terminal of K2. This allows 120 VAC to be connected to relay K2 when relay K1 is energized. Pin 19 of microcontroller U2 (signal SPD1_DRV) is connected to pin C of U1. The output of U1 (pin 14—Signal SPD1_RLY) is connected to one side of the K2 relay coil. The other side of the K2 relay coil is connected to RLAY_PWR. Diode CR12 is connected across the coil to suppress back inductive flyback energy when the relay is turned off.

The normally open terminal of K2 is connected to QC13 (signal Heat_HI). The normally closed contact of K2 is connected to the common terminal of relay K6. QC13 is connected to the tap of an external motor 20 which acts as the main blower for the furnace. The neutral connection to the main blower is provided through one of the quick connectors QC5, QC11, QC12, QC9, QC10 (signal L2). Pin 21 of microcontroller U2 (signal SPD2_DRV) is connected to U1 pin A. The output of gate A of U1 (pin 16) is connected to the coil of K6. The other side of the coil of K6 is connected to RLAY PWR. Diode CR21 is connected across the coil of K6 as well to suppress flyback energy. The NC contact of K6 is connected to QC18 (signal cool). The NO contact of K6 is attached to QC14 (signal Heat-Lo). Thus, microcontroller U2 is able to control the main blower and the speed at which the motor operates through energizing K1 and (or) K2 and (or) K6.

Pin 24 of microcontroller U2 (signal LED—DRV) is connected to resistor R15 (FIG. 1a). The other side of R15 is serially connected to the cathode of the light emitting diode LED1. The anode of LED1 is connected to VDD. Resistor R15 limits current flow through the light emitting diode. This enables microcontroller U2 to control diode LED1 to indicate various operating conditions of the gas furnace.

Pin 15 of microcontroller U2 (signal MV1_DRV) is connected to pin G of U1 (FIG. 1b). The output of U1 (pin 10) is connected to the base of the transistor Q1 (signal MV_RLY). The anode of diode CR10 is connected to RLAY_PWR while the cathode is connected to MV_PWR. Diode CR10 acts to isolate the power from the gas valve relay circuit. The signal MV_PWR is connected to resistors R8 and R14. The other side of resistor R8 is connected to the collector of Q1 and provides current limiting to the transistor. The other side of resistor R14 is connected to the base of Q1 (signal MV_RLY) and provides bias current for the transistor. The cathode of diode CR8 is connected to base of Q1 while the anode is connected to the emitter of Q1. This diode prevents excessive reverse bias voltage from occurring across the base emitter junction of Q1 when the transistor is turned on and off by the microcontroller. The emitter of Q1 is also connected to capacitor C7. The other side of capacitor C7 is connected to the coil of relay K4. The other side of the K4 relay coil is connected to ground GND. Diode CR9 is connected across the coil to suppress back inductive flyback energy when the relay is turned off. Capacitor C7 acts to store energy and provide filtering of the current flowing through the coil of relay K4 when the transistor Q1 is turned on and off. The connection and values of diodes CR10, CR8, CR9, transistor Q1, resistors R8, R14, and capacitor C7 create a negative charge pump which is applied to the coil of relay K4. This charge pump is selected so that a voltage sufficient to energize relay K4 will occur if transistor Q1 is turned on and off at a rate between 400 Hz and 2000 Hz. If the transistor is driven at any other frequency (including 0 Hz, i.e., DC) then insufficient voltage will be generated across the relay coil to energize relay K4. This scheme insures that if the microcontroller stops executing its microcode properly that the gas valve relay K4 will be de-energized.

The normally open terminal of relay K4 is connected to PSI and is the 24 VAC power source for the gas valve when relay K4 is energized. This insures that if the first stage pressure switch 14 opens due to insufficient drafting of combustion products in the gas furnace that the gas valve must be de-energized. The common terminal signal of signal MV1 relay K4 is connected to pin G of connector P1 (FIG. 1a). Pin G of connector P1 is connected to an external gas valve of the gas furnace. Thus, the microcontroller is able to control the first stage gas valve through the described components and connections.

Pin 16 of U2 (signal IND_DRV) is connected to Pin F of U1. The output of U1 gate F (pin 11) is connected to the base of transistor Q2. The anode of diode CR14 is connected to RLAY_PWR, while the cathode is connected to IND_PWR. Diode CR14 acts to isolate the power from the induced draft valve relay circuit. The signal IND_PWR is connected to resistors R38 and R48. The other side of resistor R38 is connected to the collector of transistor Q2, and provides current limiting to transistor Q2. The other side of resistor R48 is connected to the base of transistor Q2 (signal IND_RLY) and provided bias current for the transistor. The cathode of diode CR16 is also connected to the base of transistor Q2 while the anode of the diode is connected to the emitter of the transistor. This diode prevents excessive reverse bias voltage from occurring across the base emitter junction of Q2 when the transistor is turned on and off by the microcontroller. The emitter of transistor Q2 is connected to capacitor C13. The other side of capacitor C13 is connected to the coil of relay K3. The other side of this relay coil is connected to ground GND. Diode CR20 is connected across the coil to suppress inductive flyback energy when the relay K3 is turned off. Capacitor C13 acts to store energy and provide filtering of the current flowing through the coil of relay K3 when the transistor Q2 is turned on and off. The connection and values of diodes CR14, CR16, CR20, transistor Q2, resistors R38 and R48, and capacitor C13 create a negative charge pump which is applied to the coil of relay K3. This charge pump is selected so that a voltage sufficient to energize relay K3 will occur if transistor Q2 is turned on and off at a rate between 400 Hz and 2000 Hz. If the transistor is driven at any other frequency (including 0 Hz, i.e., DC) then insufficient voltage will be generated across the relay coil to energize relay K3. This scheme insures that if the microcontroller stops executing its microcode properly that the induced draft relay K3 will be de-energized. If K3 de-energizes then the induced draft motor 22 will not be powered. This in-turn causes the first stage pressure switch 14 to open (signal PSI would be off). As noted above, since the power source for the contacts of the K4 gas valve relay (signal MV1) is connected to signal PS1, the gas valve would be de-energized. Thus, this negative charge pump acts as a redundant circuit to the charge pump circuit employed for the gas valve relay. The common terminal of relay K3 is attached to signal L1 (120 VAC). The normally open contact (signal HUM) is connected to quick connect QC3 (¼" male spade terminal). This point is used to make corrections to a humidifier in the furnace. This insures that if the combustion blower is energized, that the humidifier will be on as well. The signal HUM is also connected to the common terminal of relay K7. Relay K7 is then used to select the speed of the combustion blower (induced draft) when relay K3 is energized as well.

Pin 20 of microcontroller U2 (signal Stage 2_DRV) is connected to U1, gate B input. The output of U1:B pin 15 is connected to the coil of Relay K8 and relay K7. The other side of these relay coils is attached to RLAY_PWR. Diode CR19 is connected across these relay coils as well (cathode attached to RLAY_PWR). Its purpose is to suppress inductive flyback energy when the relays are turned off. The common terminal of relay K7 is connected to signal HUM (the output of relay K3). The normally closed contact of K7 is connected to connector P4, pin C, signal IND_LO. The normally open contact of K7 is attached to connector P4, pin B, IND_HI. IND_LO and IND_HI are connected to the low and high speed taps on the induced draft motor 22 (combustion blower). Thus, if the microcontroller energizes relay K3 and does not energize relay K7, then the low speed tap of the induced draft motor will be energized. However, if the microcontroller energizes K7 (with K3 still turned on) then the high speed tap of the induced draft motor will be energized.

The normally open contact of relay K8 is connected to signal MV1. The common contact of relay K8 is attached to connector P1, pin A, signal MV2. This point is then wired to the second stage (high capacity) terminal of the gas valve. Thus, if the microcontroller energizes relay K4 (which causes MV1 to be connected to PSI) and the micro energizes relay K8, then the second stage (high capacity) input to the gas valve will be energized. This arrangement insures that the first stage of the gas valve (signal VM1) must be energized before the second stage can be energized.

Again, referring to FIG. 1c, one side of capacitor C6 is connected to signal L1 (120 VAC). The other side of the capacitor is connected to resistors R26 and R22. The other side of resistor R26 (signal FLAMPROB) is connected to pin C of connector P1, which is attached to an external flame probe 24 (see FIG. 2). Capacitor C6 provides DC isolation for the flame sense circuitry and coupling of the AC to the flame probe. Resistor R26 acts to limit current flow in case of a short of the flame probe to ground. The other side of resistor R22 is connected to the gate of Q3 (pin 1) which is an N channel MOSFET (e.g., 2N7000). The gate of Q3 is also connected to resistor R11 and the other side of resistor R11 is connected to VDD. Resistors R11 and R22 set the bias level and sensitivity for the input to MOSFET Q3. The source of MOSFET Q3 is connected to ground in a common source configuration to form a simple, high input impedance inverter. Capacitor C5 is also connected to the gate of MOSFET Q3. The other side of capacitor C5 is connected to ground GND. Capacitor C5 filters the AC component of the flame signal. When the flame probe, which is attached to pin C of connector P1 is immersed in a flame, a DC current will flow from C6 through the flame to earth ground (which is connected to Common of the 24 VAC supply in the furnace). If this DC current is of sufficient magnitude (such as 1 microamp), capacitor C5 will be discharged and the input to MOSFET Q3 will be low. This will cause the drain of MOSFET Q3 (signal FLAME) go to a logic high level. The drain of MOSFET Q3 is connected to microcontroller U2 pin 13. This allows the microcontroller to sense the presence of a flame in the gas furnace.

Pin 12 of microcontroller U2 (FIG. 1b), output signal FLTEST, is connected to the anode of diode CR13 (FIG. 1b). the cathode of diode C13 is connected to resistor R17. The other side of resistor R17 is connected to the gate of MOSFET Q3. These connections allow the microcontroller to measure the flame quality and test the flame sense circuitry described above. A detailed description of this technique is contained in commonly assigned U.S. Pat. No. 5,506,569, the subject matter of which is incorporated by this reference.

A control made as shown in FIGS. 1a–1f comprised the following components:

| | | |
|---|---|---|
| U2 | Microcontroller | 68HC05P7 |
| Q1, Q2 | Transistor | MSPA06 |
| R1, R33, R13, R18 | Resistor | 1.5K ohm, 1 W, 5% |
| R8, R38 | Resistor | 47.5 ohm, ¼ W, 1% |
| R31 | Resistor | 10.0K ohm, ¼ W, 1% |
| CR16, CR8, CR10, CR14 | Diode | 1N4148 |
| CR1–CR5, CR9 CR11, CR12, CR15 CR19, CR20, CR21 | Diode | 1N4007 1 amp |
| CR7, CR17, CR18 | Diode | 5.1 V, 5% |
| CR28 | Dioide | 12 V, 5% |
| U1 | IC | ULN2003A |
| K2, K3, K4, K5, K6 K8 | Relay | T70 SPDT 22 V |
| R6, R12, R14, R17 R23, 24, R43, R48 | Resistor | 10K ohm, ⅛ W, 5% |
| R2, R5 R19, R20, R37 R39, R41, R44, R46 R49, R51 | Resistor | 100K ohm, ⅛ W, 5% |
| R26 | Resistor | 1M ohm, ⅛ W, 5% |
| R16 | Resistor | 2K ohm, ⅛ W, 5% |
| R21, R42 | Resistor | 51K ohm, ⅛ W, 5% |
| R11 | Resistor | 5.1M ohm, ⅛ W, 5% |
| R22 | Resistor | 7.5M ohm, ⅛ W, 5% |
| R28, R30, R34 | Resistor | 39K ohm, ⅛ W, 5% |
| C4 | Capacitor | .01 uF, 50 V, 20% |
| C2 | Capacitor | 10 uF, 16 V |
| C1, C7, C13 | Capacitor | 47 uF, 50 V |
| CR13 | Diode | 1N458A |
| LED1 | LED, red | |
| C6 | Capacitor | 1000 p F, 1 KV, 10% |
| C5, C10, C11 C12, C20, C21 | Capacitor | .1 uF, 100 V, 10% |
| K1 | Relay | T9A, SPST |
| K7 | Relay | SPDT, 24 V |
| C9 | Capacitor | .47 uF, 50 V |
| R7, R9 | Resistor | 560 ohm, 2 W, 5% |
| R47, R50 | Resistor | 20K ohm, ⅛ W, 5% |
| R35, R36 | Resistor | 100 ohm, 2 W, 5% |
| R15 | Resistor | 510 ohm, ⅛ W, 5% |
| R10 | Resistor | 30K, ⅛ W |

Figure 3A:
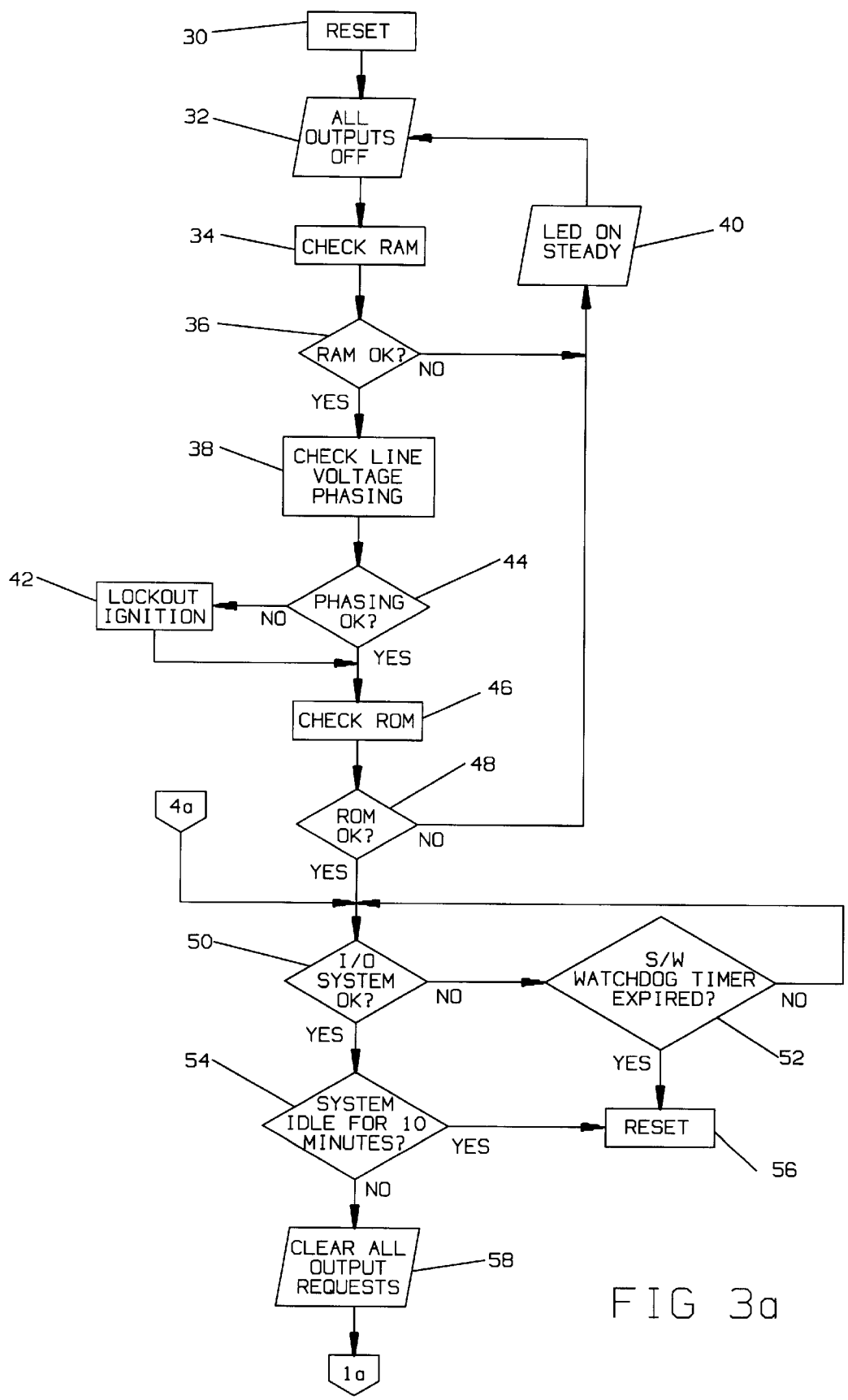
Figure 3B:
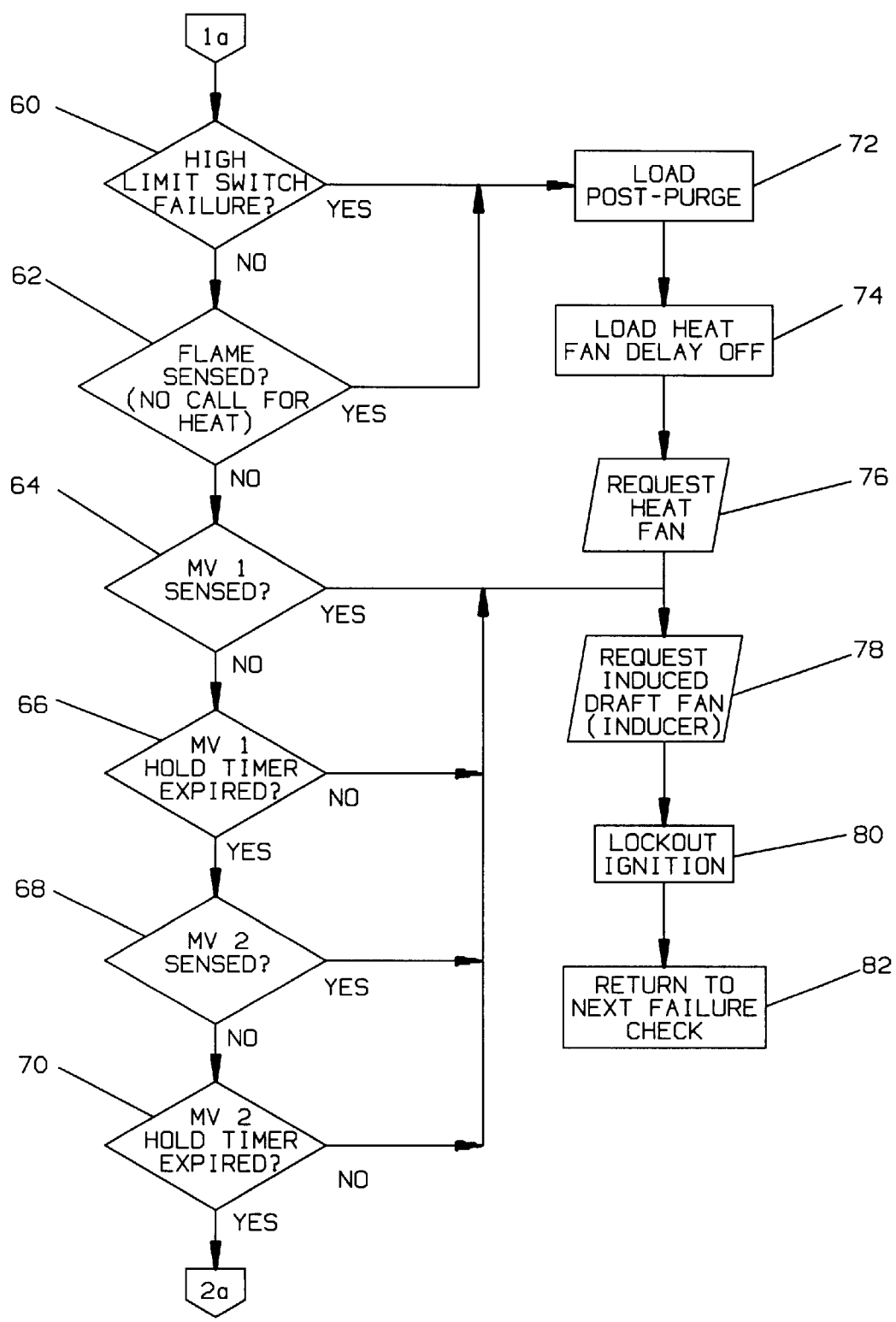
Figure 3C:
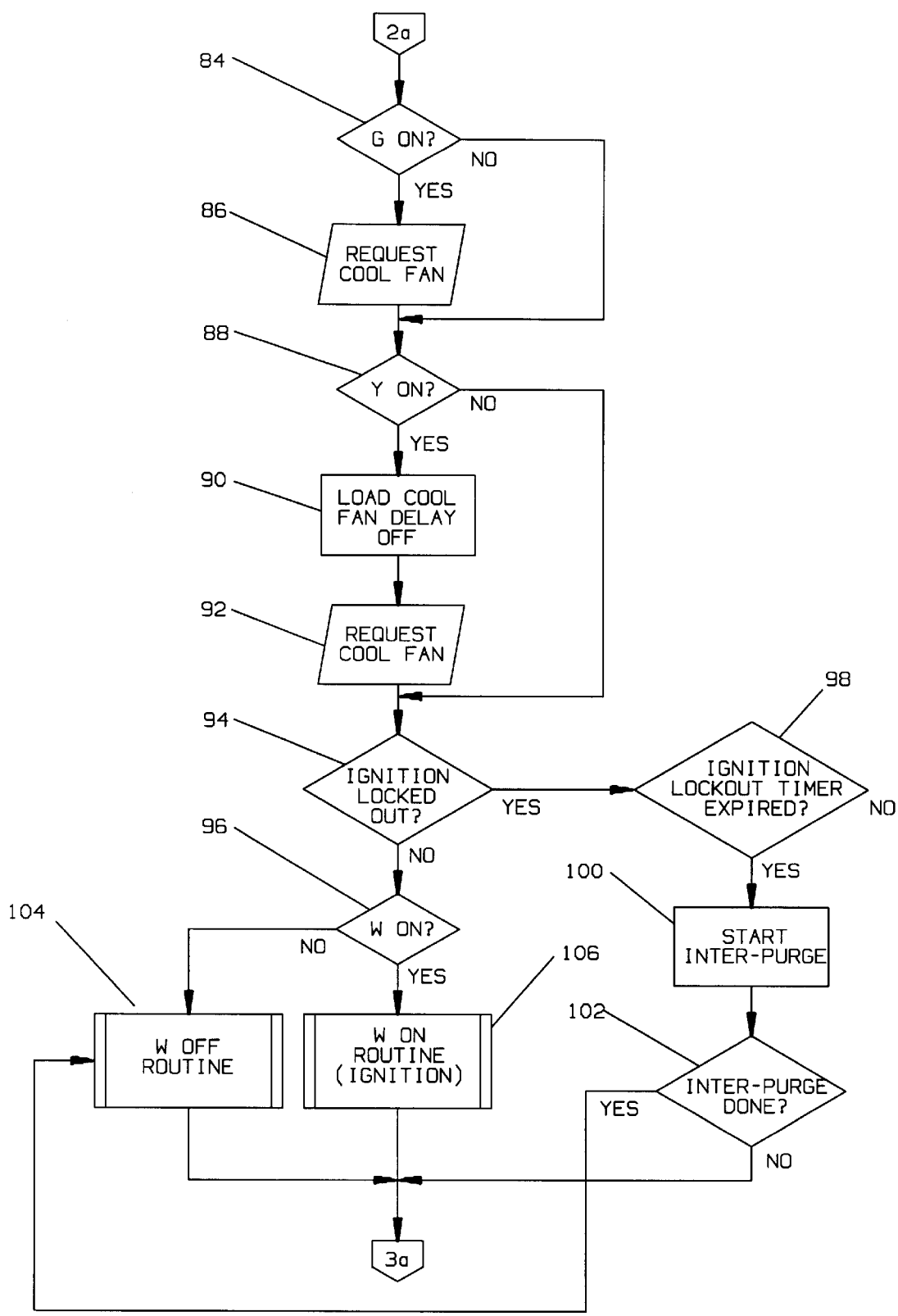

FIGS. 3a–3h show software flowcharts for operation of microcontroller U2 in accordance with the invention. In FIG. 3a, upon power-up at 30, the RAM of microcontroller U2 is tested in steps 32–36. Line voltage phasing is performed in steps 38, 42 and 44. The ROM of microcontroller U2 is tested in steps 46, 48. If the decision of steps 36 or 48 is negative an LED is energized at 40 and the routine goes back to step 32. Steps 50–56 monitor the standby operations of the system. All output requests are set to a known off condition in step 58 to point 1a. Continuing on from point 1a in FIG. 3b various safety conditions are checked, including limit switch failure, flame failure, as well as main valve 1 and/or 2 failure, in steps 60–82 to point 2a. Continuing on from point 2a in FIG. 3c at decision block 84, the routine checks to see if the thermostat signal G is present and if so it requests the cool fan at step 86. If signal G is not present, the routine skips step 86. The routine then looks for the thermostat signal Y and controls the cool fan accordingly at steps 88–92. If signal Y is not present, the routine skips to step 94. Ignition lock-out is checked at decision block 94 and upon a positive response the routine performs related lock-out steps 98–102. If the ignition lock-out test is negative, decision block 96 checks for the presence of thermostat signal W and then the routine goes to the signal W On routine at 106 or the signal W Off routine at 104 and when returning from either routine continues to point 3a.

Figure 3D:
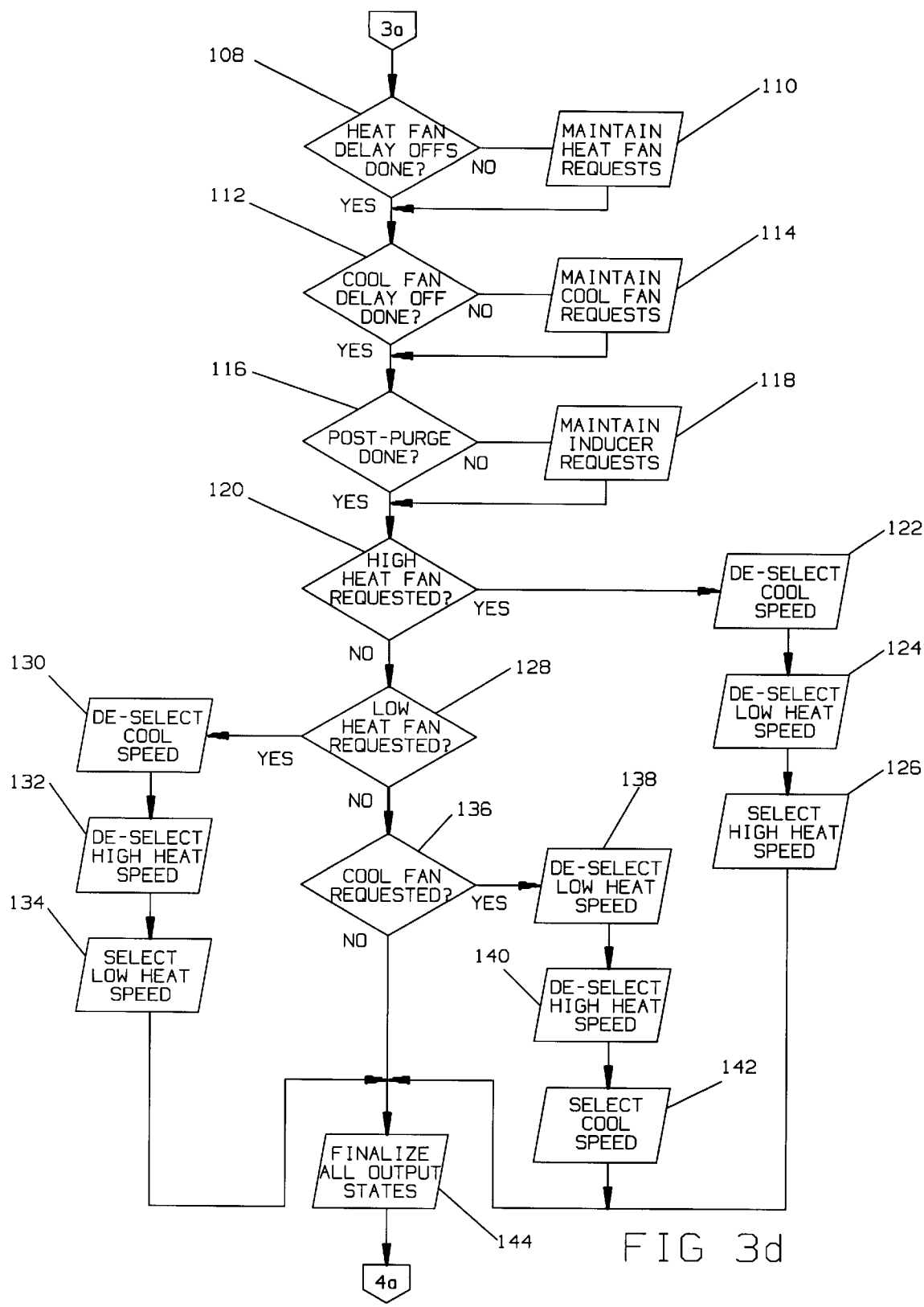

Decision block 108 in FIG. 3d checks to see if the heat fan delay off is done and, if not, it keeps the heat fan requested at step 110. Decision block 112 checks to see if the cool fan delay off is done and, if not, it keeps the cool fan requested at step 114. Decision block 116 checks to see if the inducer post-purge is done and, if not, it keeps the inducer requested at step 118. In decision block 120, the high speed heat fan request is checked and, if requested, steps 122–126 de-select any other fan speed and sets the heat fan high speed. In decision block 128 the low speed heat fan request is checked and, if requested, steps 130–134 de-select any other fan speed and sets the heat fan low speed. In decision block 136 the cool fan request is checked and, if requested, steps 138–142 de-select any other fan speed and sets the cool fan speed. All output states are finalized and set to be put on the output bus at step 144. The routine then returns to point 4a shown in FIG. 3a at decision block 50 and repeats the loop continuously.

Figure 3E:
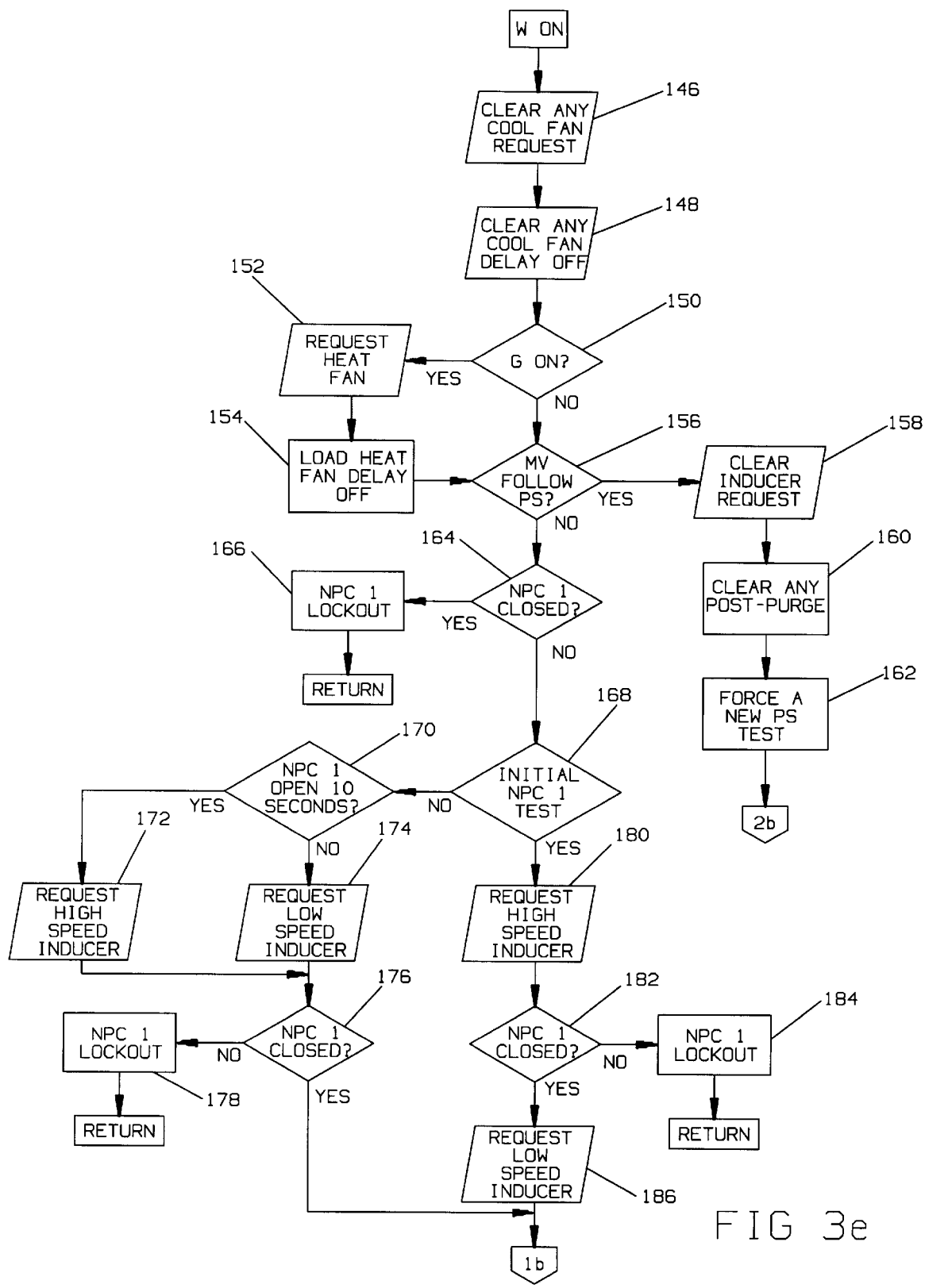
Figure 3F:
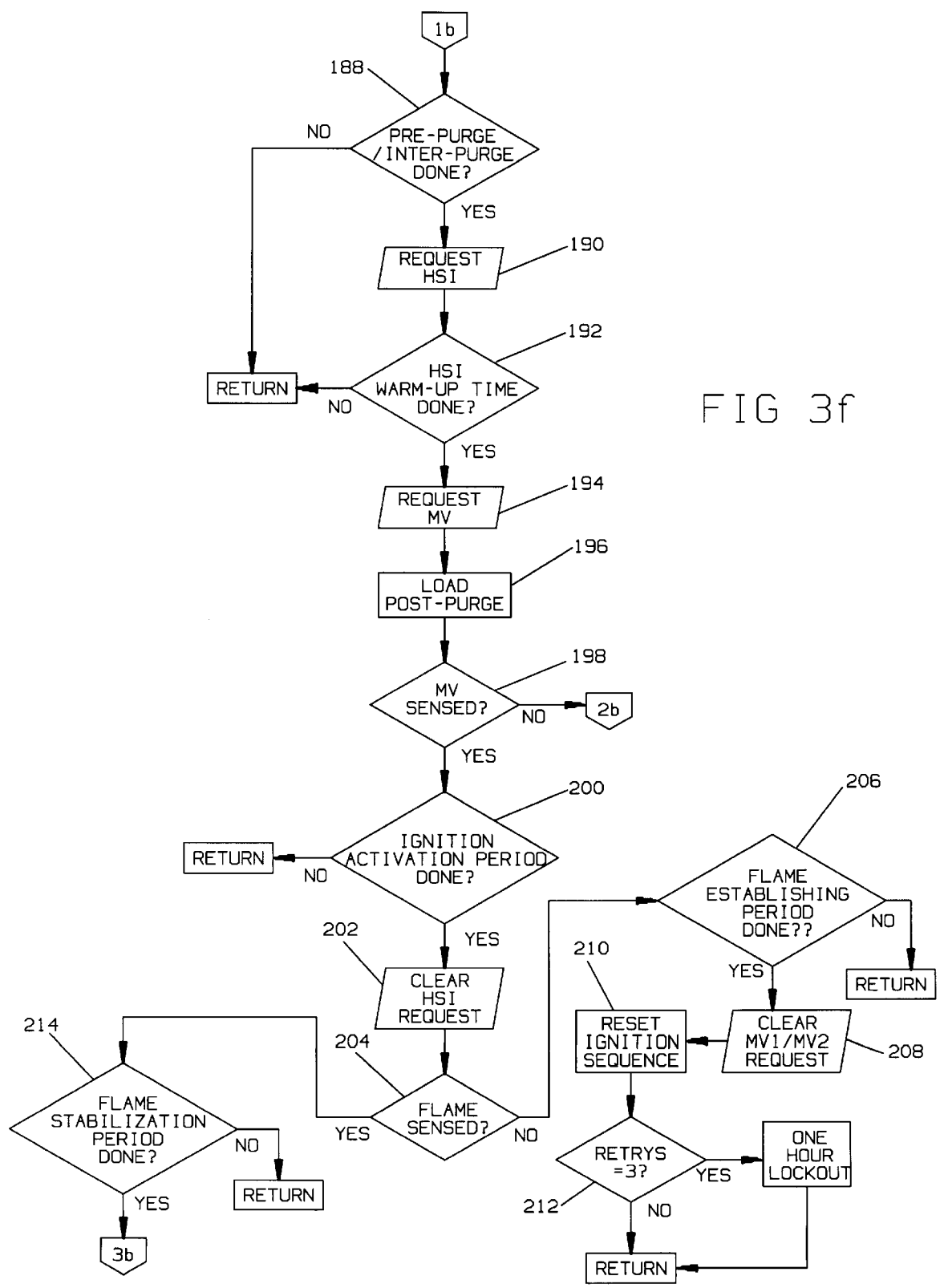

With reference to the W On routine in FIG. 3e, steps 146, 148 clear any cool fan requests and off delay that may be pending. Decision block 150 checks to see if G is on, if so, steps 152,154 requests the heat fan and loads a delay off. If G is not on, decision block 156 monitors the main valve signal to see if it follows the open and closure of the negative pressure control and, if so, performs steps 158, 160 to handle the failure and force a new PS test at 162 and to point 2b of FIG. 3G, step 220, turning off the gas valves. If not, it checks to see if negative pressure control 1 (switch 14, FIG. 2) is closed at decision block 164. If negative pressure control 1 is closed then an NPC lockout is flagged in step 166 and a return from the routine to point 3a of FIG. 3d at decision block 108 is performed. If negative pressure control 1 is open, decision block 168 determines if this is the initial test or a failure after the initial test. If not, decision block 170 checks if negative pressure control 1 has been open for 10 seconds. If so, the high speed inducer blower requested at step 172 is performed, otherwise the low speed inducer operation requested at step 174 is performed. This path is continued until decision block 176 determines that negative pressure control 1 re-closed and progresses to point 1b; otherwise, an NPC lockout is flagged in step 178 and a return from the routine to point 3a of FIG. 3d at decision block 108 is performed. Returning to decision block 168, if this is an initial test then step 180 requests the high speed inducer which should close negative pressure control 1. At decision block 182 negative pressure control 1 is, again, monitored for closure. If not closed, an NPC lockout is flagged in step 184 and a return from the routine to point 3a of FIG. 3d at decision block 108 is performed. Otherwise, step 186 requests low speed inducer operation and continues to point 1b of FIG. 3f at decision block 188.

Decision block 188 determines if the pre-purge/interpurge has been completed. If the negative pressure control has tested good, the main valve is not on and step 188 has been completed, then the igniter is turned on at step 190 and at decision block 192, if the warm-of timer is done, the main valve relay is turned on at step 194. If decision block 192 is negative then the routine moves to point 3a of FIG. 3d. Going back to a positive answer at decision block 192, the post purge is loaded at step 196, then the status of the main valve is checked at step 198. If the main valve is on, decision block 200 checks to see if the ignition activation period has been completed and when it is completed the igniter is turned off at step 202. If the main valve is off at step 198 then the routine goes to point 2b step 220, FIG. 3G to be discussed, and if the ignition activation period is not done (step 200) the routine goes to point 3a of FIG. 3d. After turning off the igniter in step 202, flame sense is checked at decision block 204 and if it is not present and the flame establishing period is completed (decision block 206) the main valve is turned off at step 208. If the flame establishing period is not completed the routine goes to point 3a of FIG. 3d. Going back to step 208 after the gas valve has been turned off, the ignition sequence is reset at step 210 and decision block 212 determines if there have been 3 retries; if so, a one hour ignition lockout occurs; otherwise, a return from the routine to point 3a of FIG. 3d at decision block 108 is performed. Returning to decision block 204, if flame is present, then the flame stabilization timer is checked at decision block 214. If it is done then the routine continues to point 3b of FIG. 3g and decision block 216; otherwise, a return from the routine to point 3a of FIG. 3d at decision block 108 is performed.

Figure 3G:
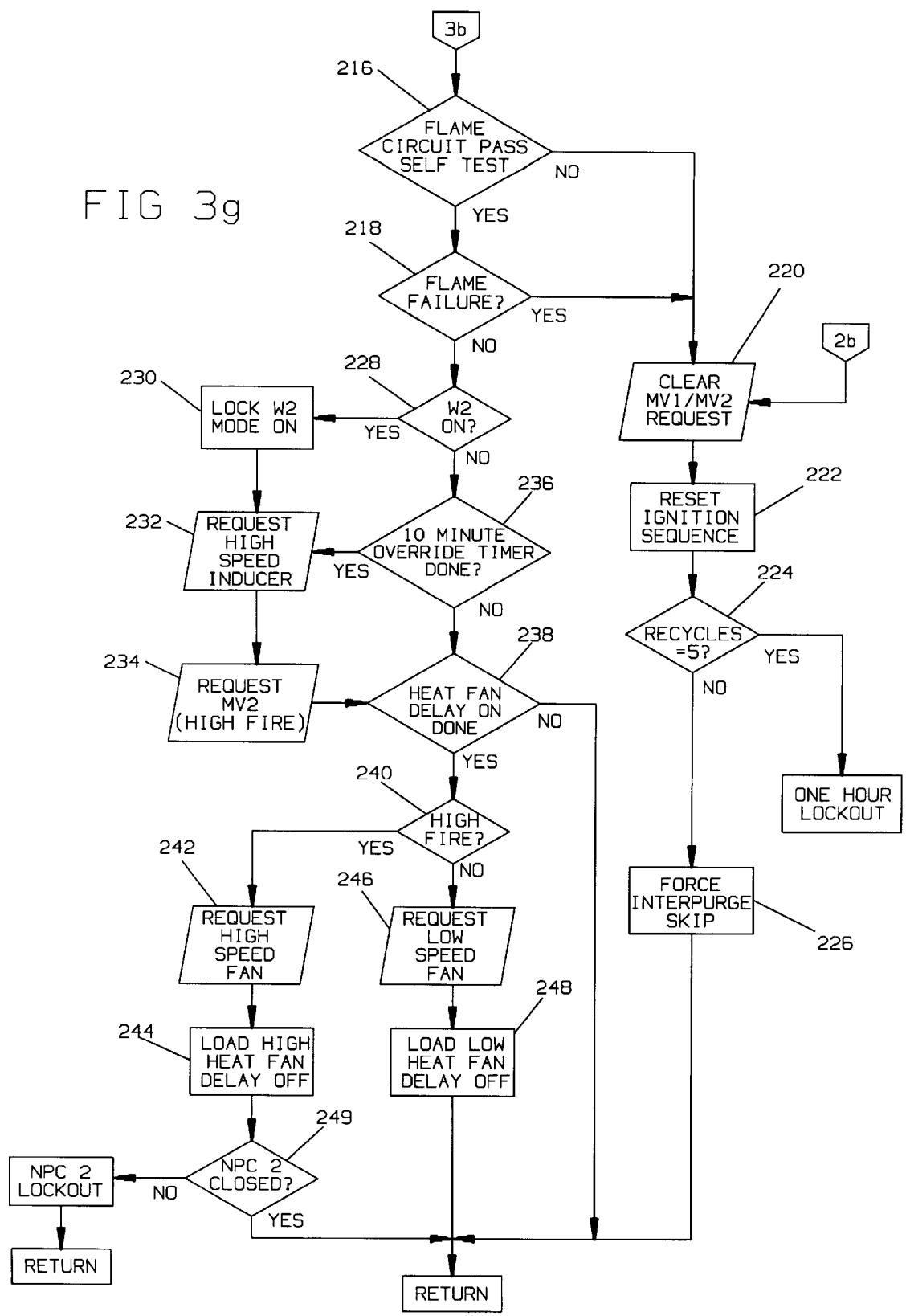

From point 3b shown in FIG. 3g, flame characteristics are checked in decision blocks 216 and 218. If the flame failure time of decision block 218 has expired or the flame circuit does not pass self test of decision block 216 then all gas valves are turned off at block 220, the ignition sequence is reset and the recycles are checked in steps 220, 224. If five recycles have occurred then a one hour ignition lockout is started; otherwise, step 226 forces the inter-purge to be skipped during a recycle. Decision block 228 determines if a W2 signal is present at the control. If so, then step 230 locks this mode into operation for this call for heat and then resets the mode at the end of the heat call. Once this mode is locked into, the control will only allow high fire if the W2 signal is present and ignores the override timer. Step 230 is followed by steps 232, 234 which request high speed inducer operation and opening of main valve 2, which puts the furnace into high fire mode and on to decision blocks 238 verifying that the heat fan delay on has been completed and if so to decision block 240 verifying high fire. If W2 is not on at decision block 228, then decision block 236 determines if 10 minutes of ignition have occurred. This allows the furnace to operate both stages with only a single single-stage thermostat that provides only a W1 signal. If so, steps 232, 234 place the furnace in high fire mode; otherwise, decision block 238 verifies if the heat fan delay on has been completed and either continues to decision block 240 or returns from the routine to point 3a of FIG. 3d at decision block 108. At decision block 240, if in high fire, steps 242 and 244 request high speed heat fan operation and a delay off; whereas, if not high fire, steps 246 and 248 request low speed heat fan operation and a delay off. If in high fire, a decision block 249 checks if negative pressure control 2 (switch 16, FIG. 2) is closed; if not, an NPC lockout occurs. Otherwise, both decision block 249 and step 248 force a return from the routine to point 3a of FIG. 3d at decision block 108.

Figure 3H:
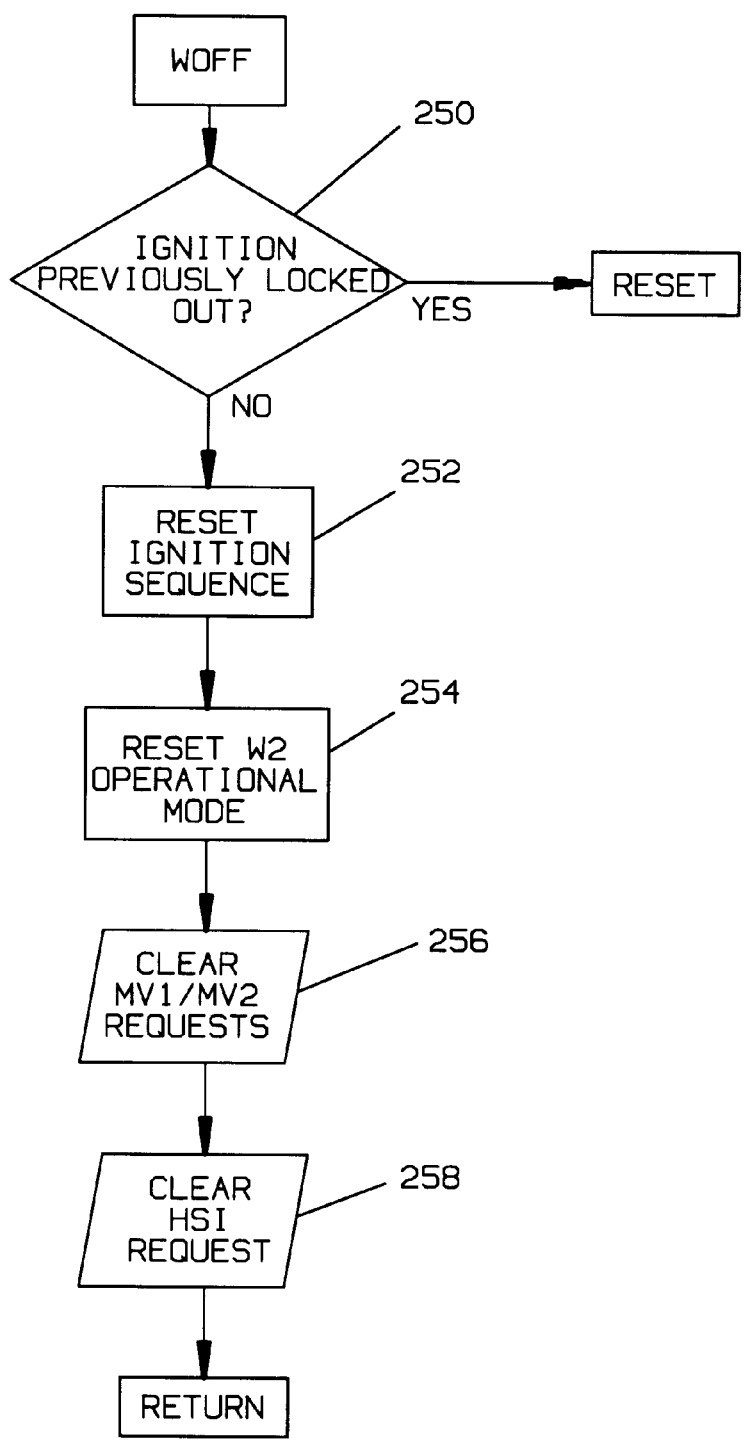

FIG. 3h shows the thermostat signal W Off routine comprising decision block 250 checking for a previous igniti n lockout, resetting the ignition lock-out at step 252, resetting the W2 operational mode at step 254, turning off the main valves at 256, turning off the hot surface igniter at 258 and finally returning from the routine to point 3a of FIG. 3d at decision block 108.

Various additional changes and modifications can be made in the above described details without departing from the nature and spirit of the invention. It is intended that the invention will not be limited to the details except as set forth in the appended claims.

What is claimed is:

1. A method for controlling the energization of a two stage gas furnace having a first stage, low combustion operation operable by a W1 request for heat signal and a second stage, high combustion operation operable by a W2 request for heat signal and a room thermostat for providing a least a W1 request for heat signal comprising the steps of:

determining if there is a W1 request for heat signal;

upon determining that there is a W1 request for heat signal, determining if there is a W2 request for heat signal;

upon determining that there is no W2 request for heat signal, initiating a timer and upon expiry of a selected period and continuous existence of a W1 request for heat signal, energizing the second stage high combustion operation; and upon determining that a W2 request for heat signal is present, bypassing the timer and energizing the second stage high combustion operation, whereby both single stage and two stage room thermostats can be used in controlling operation of the two stage gas furnace.

2. A method according to claim 1 in which the selected period is approximately 10 minutes.

3. A method according to claim 1 in which moving the room thermostat to at least a selected delta degrees higher setting generates a W2 request for heat signal.

4. A method according to claim 3 in which the selected delta degrees high setting is approximately 10° F.

5. Control apparatus for use with a two stage gas furnace having a first stage, low combustion operation operable by a W1 request for heat signal coupled to an input port of the microcontroller, and a second stage, high combustion operation operable by a W2 request for heat signal and a room thermostat for providing at least a W1 request for heat signal coupled to another input port of the microcontroller comprising:

a microcontroller having input and output ports, a timer activated for a selected period whenever there is a W1 request for heat signal during first stage operation and upon expiry of the selected period and the continuous absence of a W2 request for heat signal, means coupled to an output port of the microcontroller for energizing the second stage operation, whereby a single stage thermostat can be used to control operation of both stages of a two stage gas furnace.

6. Control apparatus according to claim 5 in which the selected period is approximately 10 minutes.

7. Control apparatus according to claim 5 further comprising means to bypass the timer in response to the presence of a W2 request for heat signal.

8. Control apparatus according to claim 5 further comprising means to generate a W2 request for heat signal whenever the room thermostat is moved to at least a selected delta temperature higher setting.

9. Control apparatus according to claim 8 in which the selected delta temperature is approximately 10° F.

* * * * *